United States Patent [19]
Melton et al.

[11] 3,972,390
[45] Aug. 3, 1976

[54] ENERGY ABSORBING DEVICE

[75] Inventors: Donald F. Melton, Minneapolis; Karl E. Neumeier, Stillwater, both of Minn.

[73] Assignee: Programmed & Remote Systems Corporation, St. Paul, Minn.

[22] Filed: Mar. 5, 1975

[21] Appl. No.: 555,448

[52] U.S. Cl. ................................ 188/1 C; 293/70
[51] Int. Cl.² ................................................. F16F 7/12
[58] Field of Search ........... 74/492; 188/1 C; 293/1, 293/70

[56]  References Cited
UNITED STATES PATENTS

| | | | |
|---|---|---|---|
| 2,835,348 | 5/1958 | Sadtler | 188/1 C |
| 2,933,127 | 4/1960 | Brewster | 188/1 C X |
| 3,663,048 | 5/1972 | Zimmerle | 188/1 C X |
| 3,717,223 | 2/1973 | Alfes | 188/1 C |

*Primary Examiner*—Duane A. Reger
*Attorney, Agent, or Firm*—Dugger, Johnson & Westman

[57] ABSTRACT

An energy absorbing device designed to absorb kinetic energy of moving objects by the inelastic stretching of one of its members. The device has at least two support members, and when subjected to load in an axial direction portions of the members will move apart. The portions which move apart are connected by a strap or straps made of a material which will inelastically yield a substantial amount before failure. Thus, when axial forces exceeding a preselected amount are absorbed inelastic yielding occurs to absorb energy.

12 Claims, 9 Drawing Figures

ENERGY ABSORBING DEVICE

BACKGROUND OF THE INVENTION

1. Field of the Invention

The present invention relates to devices designed to absorb kinetic energy of a moving member.

2. Prior Art

In the prior art, various energy absorbing devices have been advanced, for example for automobile bumpers and steering wheel columns, and for absorbing energy of some air dropped items.

A unit which utilizes the buckling of members to provide a braking action for an air drop projectile is shown in the Franck et al. U.S. Pat. No. 3,528,530. A plurality of columns bend in the center to spread outwardly or mushroom out to provide a large diameter restraint for braking as the projectile enters the ground. There is no tension band which absorbs energy as the columns buckle.

Various columnar devices which will absorb energy while they are subjected to compression loads have been used in various applications including steering columns, as illustrated in U.S. Pat. No. 3,373,629 which shows an expanded metal section that buckles and absorbs energy. U.S. Pat. No. 3,587,787 shows an energy absorbing material, and mentions various prior art shock absorbing devices such as shear pins, nesting conical cylinders and honeycomb type shock absorbers.

U.S. Pat. No. 3,412,628 shows an energy absorbing unit that longitudinally crushes, but the energy appears to be absorbed by bending members rather than inelastic elongation of any tension bands. A crushable tube used as an energy absorber for a bumper is also shown in U.S. Pat. No. 3,437,367.

Thus, while certain energy absorbers have been shown in the prior art, devices that are simple to manufacture, low in cost, and which will absorb a substantial amount of energy while limiting the maximum loads imposed on the support structure are still sought. Further, devices which will take some eccentric loading are needed.

SUMMARY OF THE INVENTION

The present invention relates to a device for absorbing kinetic energy by the inelastic yielding or stretching of one of its elements. An assembly of a plurality of members is supported and when at least one of the members is loaded in compression in direction toward the support, portions of the members move apart against the resistance of a band or strap which yields or stretches inelastically.

In one form a plurality of columns buckle in their center portions and a band which encompasses the columns will yield as they buckle. The yielding band or bands are selected to be of a material that will inelastically yield a substantial amount before failure and during the yielding of the band or bands energy is absorbed.

Included in the first form are separate tension carrying bands positioned to be generally parallel to the direction of loading, and positioned on opposite sides of the neutral axis of the member so that when an off center load is applied, which tends to tilt the device and cause some of the upright suports to bend more than others, the tension carrying bands on the opposite side of the neutral axis from the center of load will carry the overturning moment load caused by eccentric loading, rather than transferring the load to the adjacent, normally bendable support columns.

The construction disclosed in the first form is an open framework which permits circulation of water or other fluids through the energy absorbing device, and thus the device finds particular use in connection with storage racks for nuclear fuel elements which require cooling water circulation.

A second form of the invention includes a pair of telescoping tubes which, when loaded, move and cause inelastic yielding of bands connecting portions of the tubes.

DESCRIPTION OF THE PREFERRED EMBODIMENTS

Figure 1:
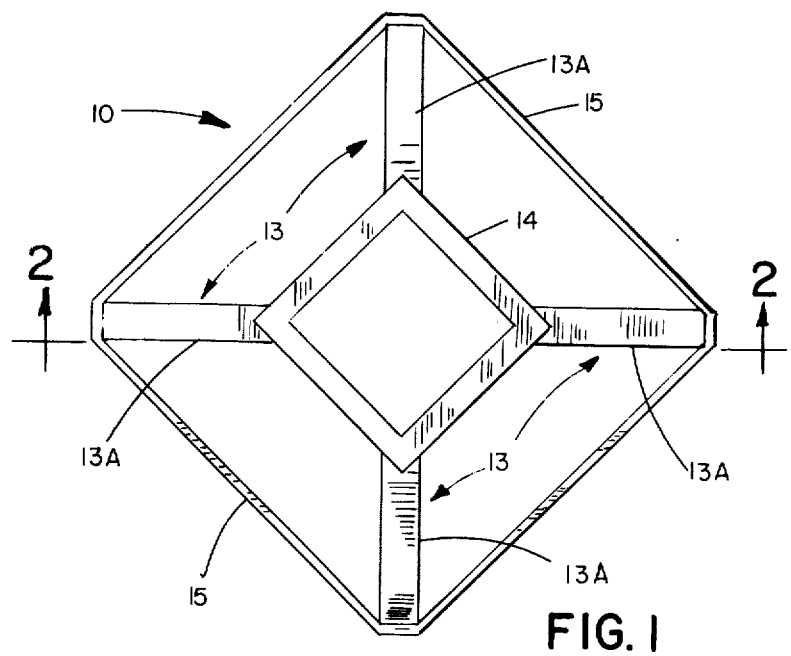
FIG. 1 is a top plan view of an energy absorbing device made according to a first form of the present invention.
Figure 2:
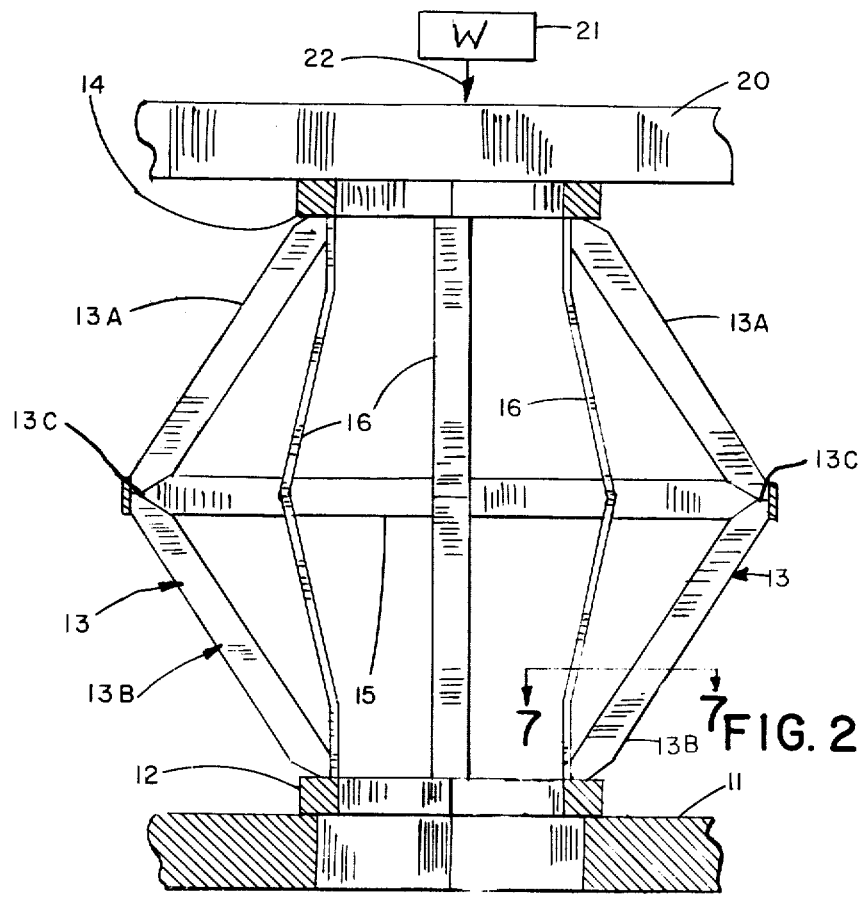
FIG. 2 is a sectional view taken as on line 2—2 in FIG. 1, showing the device before it has been deformed by absorbing energy.

The energy absorber device illustrated generally at 10 as shown is supported on a fixed plate or support 11, that can be of any configuration. The energy absorber comprises a bottom ring support member or plate 12, a plurality of upright compression carrying and bendable members 13, and a top ring support member or plate 14 which is substantially identical in contruction to the member 12. The members 12 and 14 can be of any desired peripheral shape, and can be solid plates or open in the center as shown. When they have open centers as shown, items can be lowered through the openings and they will permit more circulation of liquid, thus finding usefulness in nuclear fuel storage racks.

The bendable members 13 are formed in two sections 13A and 13B, as shown, and as shown are rectangular in cross section. They, however, can be angle irons, channel irons, tubes or other suitable cross sections. As shown, the members 13 bow or extend outwardly from their fastening to the respective plates 12 and 14 and the two sections 13A and 13B are joined as at 13C in these bowed, bending portions. There is a weakened or cut out region at the junction portion between sections 13A and 13B to encourage buckling of the members 13 under compression. In the exterior of the device, where sections 13A and 13B join, there is a flat surface formed and a tension band or strap 15 rests on this surface and encircles the members 13. The band 15 is attached to each of the bendable members 13. The tension band 15 is a continuous, closed band, either welded or otherwise fastened closed after being positioned in line with the weakened bending portion adjacent junction 13C. When the members 13 tend to buckle under a compression load they will tend to spread apart in the central bending portions and such spreading will be resisted by band 15.

There are four tension carrying straps 16 positioned in alignment with the bendable members 13 but extend substantially directly from the top plate 14 to the bottom plate 12 and the straps 16 are fastened at their opposite ends to the respective plates. Small offsets in the center portions of the tension members 16 can be utilized to insure that they will normally deform outwardly as the bendable members 13 bend.

Figure 3:
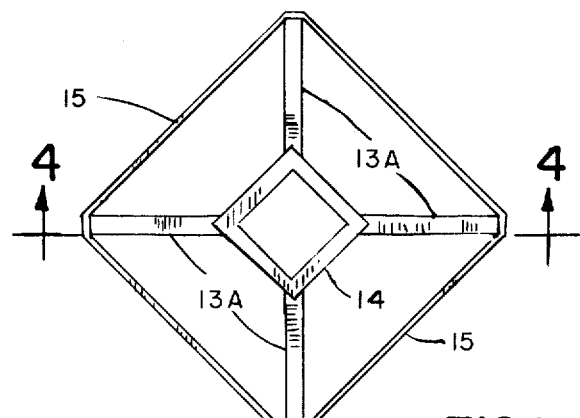
FIG. 3 is a top plan view of the device after use.
Figure 4:
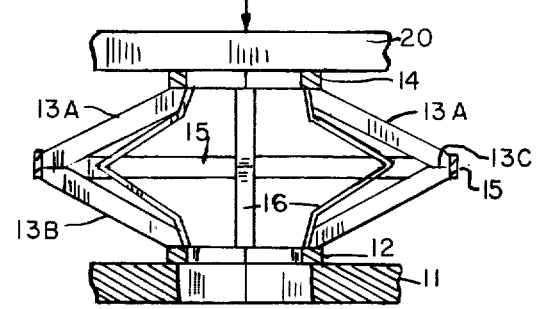
FIG. 4 is a sectional view taken as on line 4—4 in FIG. 3.

A top loading plate 20 may be used for carrying loads directly to the plate 14. This top plate 20 is a movable plate that would support loads, such as a weight 21 acting in the direction of arrow 22, which is parallel to the longitudinal central axis (neutral axis) of the energy absorbing device 10. The weight 21 will strike the loading plate 20 and transfer kinetic energy to the energy absorbing device. Because the bendable portions adjacent junction 13C of the bendable members 13 are weak, they will tend to fold and bend and thus buckle outwardly. The buckling will be resisted by tension loading in the encircling band 15. For example with a maximum force exerted on the loading plate 20, the bendable members may be bent to position as shown in FIGS. 3 and 4. There, a centered force F has caused the members 13 to bend in their center portions, inelastically elongating the band 15 resulting in energy absorption. The material forming band 15 is stretched beyond its yield range but is not loaded beyond its ultimate tensile stress. The material for band 15 is selected from materials which will stretch or yield a substantial amount before they reach their failure point. A suitable material for example is a 300 series stainless steel. All during the yielding of the band 15, it will be absorbing energy required to stretch the material and the energy is not stored as in the case of a spring.

Absorbing the kinetic energy from the weight 21 will cause the velocity of the weight to decrease until it comes to an at rest position. For example as shown in FIGS. 3 and 4.

Figure 5:
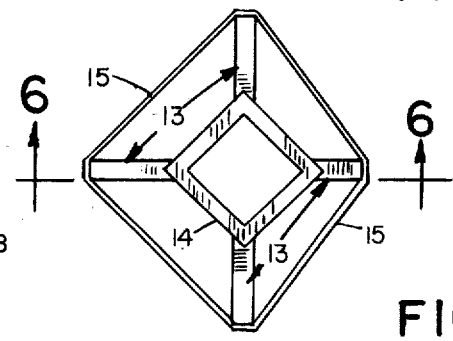
FIG. 5 is a top plan view of the device in the initial stages of absorbing an off-center load.
Figure 7:
FIG. 7 is a sectional view taken as on line 7—7 in FIG. 2.
Figure 6:
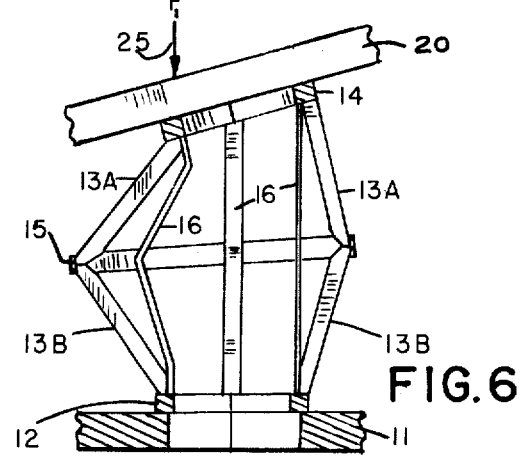
FIG. 6 is a sectional view taken as on line 6—6 in FIG. 5.

In FIGS. 5 and 6, the energy absorbing device is illustrated when an off-center force $F_1$ indicated by the arrow 25 would be received. In the initial stages of energy absorption the load would tend to cause the upper plate 14 to pivot about the central or neutral axis of the device. The tension member 16 to the right hand side of the view in FIG. 6 will stretch, preventing the straightening out of the bendable member 13 on that side as the plate 14 pivoted about the two members 13 at the front and rear of the unit as illustrated in FIG. 6. Then, as the load continues to be carried downwardly in the direction of arrow 25, all of the bendable members will bend outwardly in their center portions once the compression loads have equalized.

There are four bands 16, one by each member 13, and the band or bands 16 which will be placed in tension with an eccentric load will vary with the location of the center of load.

The four bands 16 are attached to both of the rings or plates 12 and 14, and this tends to make them bow outwardly, but the slight offset shown insures that they will bend properly under compression loading. Also, the separate tension bands or straps insure that the energy absorbing device will continue to function when it is loaded eccentrically. When it is initially loaded eccentrically as shown in FIG. 6 the bands 16 on the side opposite from the eccentric loading, which is thrown into tension, will absorb energy. As the device continues to deform along its center line, then all of the bendable members 13 will start to bend in a normal manner and will stretch the band 15.

It should be noted that while four compression bendable members 13 are shown, more or less can be utilized. In summary, the compression carrying bendable members or columns, which are oriented with their longitudinal axes extending generally in the direction of applied force to be absorbed will buckle apart, thereby increasing the distance between at least portions of the compression carrying members as they bend, and the yieldable tension band which will be stretched inelastically to resist this bending of the compression carrying bendable members. The addition of the straps 16 to permit operation even under eccentric loading enhances the operation of the unit.

While stainless steel has been mentioned as a suitable type of material for elongating member 15, other suitable materials also can be used. Nonelastic yielding of the material without failure absorbs substantial energy.

Figure 8:
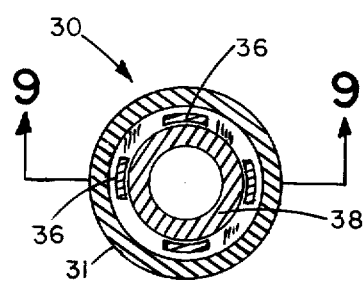
FIG. 8 is a sectional view of a second form of the present invention taken on line 8—8 in FIG. 9.
Figure 9:
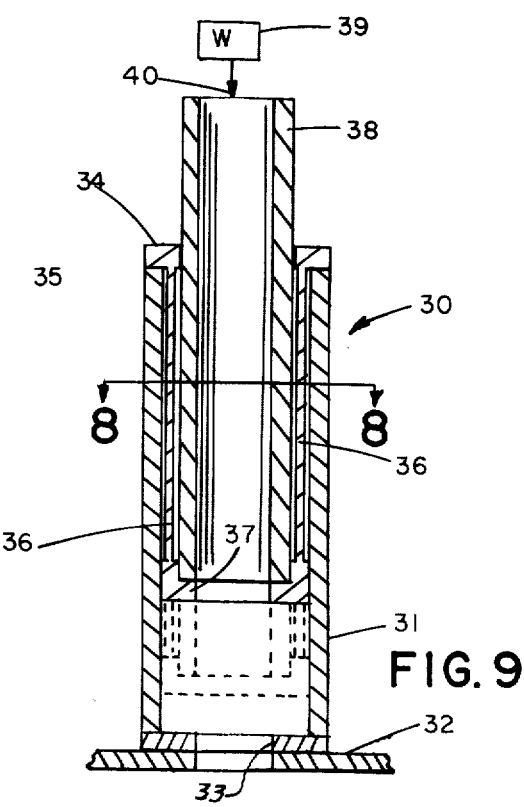
FIG. 9 is a sectional view taken as on line 9—9 in FIG. 8.

Referring to the second form of the invention shown in FIGS. 8 and 9, an energy absorbing device illustrated generally at 30 comprises an outer tube 31 mounted onto a support member 32 that is fixed. The outer tube, as shown, can have a plate 33 at the lower end, if desired. The plate 33 has an open center to permit water to circulate through this device as well.

At the upper end of the outer tube a cap member 34 is mounted so that its rests on the tube 31. The cap has an annular flange 35 that extends into the interior of the outer tube 31 and a plurality of straps 36 are fixed to the flange. As shown four straps 36 are used. The lower or second ends of the straps 36 are attached to a lower collar or support 37 that in turn supports an inner tube 38. The tube 38 extends slidably outwardly from the cap 34 through a provided opening. Resistance to relative telescoping or sliding of the tubes is provided by the support 37 and by the straps or bands 36. The tube 38 could be a solid member if desired.

If a weight indicated at 39 is dropped onto the energy absorbing device in the direction of the arrow 40, it will engage a first end of the assembly comprising the end of the tube 38. The kinetic energy, which is proportional to the weight times the velocity squared is transferred from the tube 38 to the member 37 (which is slidably mounted in tube 31) and thence to the straps 36. The straps 36 are supported with respect to the support 32 through the tube 31 and the end cap 34. Thus, if the force tending to separate the lower end portion of tube 38 and the upper end of tube 31 exceeds a particular amount the tube 38 will telescope relative to the tube 31, for example to the position shown in dotted lines in FIG. 1, thereby inelastically elongating or yielding the straps 36 under tension.

The inelastic yielding of the straps 36 will absorb energy, slowing down the movement of the weight 39, and eventually arresting this movement when the energy has been completely absorbed.

It should be noted that the straps 36 are positioned within the annular space between the inner surface of the outer tube 31, and the outer surface of the inner tube 38 so that the straps will not tend to buckle or bend any substantial amount even if they were subjected to a compressive load.

This form of the invention requires a greater overall axial length than that which is required for the first form of the invention in order to obtain the desired amount of energy absorption. In the first form of the invention the axial movement of the bending columns required for substantial elongation of the band 15 is relatively low.

When the tube 38 telescopes relative to the tube 31, the energy absorption is provided by the straps or members 36 which join the portions of the tubes that tend to separate and resist such separation until they are inelastically yielded.

The straps 36 also may be of suitable material such as 300 series stainless steel, which elongates a substantial amount inelastically before it fails.

What is claimed is:

1. An energy absorbing device for absorbing kinetic energy from a moving load moving in direction toward a support comprising a plurality of individual bending members arranged at spaced locations to define a bounded space, said bending members having first ends adapted to be supported on a fixed support and second ends adapted for receiving a load tending to compress said bending members, said bending members having portions which separate under compression so that the distance between said portions increases, and a band encircling said bending members adjacent said portions and elastically yielding under tension to absorb energy as said bending members bend and said portions separate.

2. The combination as specified in claim 1 wherein said bending members have weakened sections in the midportions thereof adjacent to said band.

3. The combination as specified in claim 2 wherein there are an even plurality of said bending members symmetrically arranged around a central axis.

4. The combination as specified in claim 3 and first and second support members connected to the first and second ends of said bending members, respectively, and a plurality of tension members connecting said first and second support members and symmetrically arranged around said central axis on a side of the bending members toward said central axis.

5. The combination as specified in claim 1 wherein said bending members are arranged in spaced location around a central axis, said bending members being bowed outwardly from the central axis in said portions thereof and between said first and second ends.

6. The combination as specified in claim 4 wherein said first and second support members comprise plate members fixed to said bending members.

7. An energy absorbing device for absorbing kinetic energy from a moving load moving in direction toward a support comprising a plurality of telescoping members in an assembly having a first end adapted to be supported on a fixed support and a second end adapted for receiving a load tending to compress said telescoping members, said telescoping members having portions which separate under compression so that the distance between said portions increases, and tension carrying means connecting said portions and yielding to absorb energy as said portions separate.

8. An energy absorbing device comprising an assembly adapted to be supported on a fixed support at a first end thereof, and adapted to receive a load at a second end thereof and to absorb loads moving in an axial direction toward said support, said assembly including at least two relative movable members having portions which change in spacing upon movement of said second end toward the first end comprising an outer tubular member and a telescoping inner member inside the outer member, and means positioned between said outer tubular member and the inner member joining said portions of said members and which will inelastically yield when said portions change in spacing.

9. The combination as specified in claim 8 wherein said means joining said portions is positioned to yield in tension.

10. The combination of claim 8 wherein said relatively movable members include a plurality of supports which have portions that bend and separate when the second end moves toward the first end.

11. The combination as specified in claim 8 wherein said means joining said portions comprise a plurality of straps arranged around the outside of said inner member.

12. The combination as specified in claim 11 wherein said straps have first ends fixed with respect to a first of said members, and second ends fixed with respect to a second of said members.

* * * * *